United States Patent [19]

Raiko

[11] Patent Number: 4,866,928
[45] Date of Patent: Sep. 19, 1989

[54] GAS TURBINE POWER PLANT FIRED BY A WATER-BEARING FUEL AND METHOD FOR UTILIZING THE HEAT VALUE OF SAID FUEL

[75] Inventor: Markku Raiko, Espoo, Finland

[73] Assignee: Imatran Voima Oy, Helsinki, Finland

[21] Appl. No.: 150,146

[22] Filed: Jan. 29, 1988

[30] Foreign Application Priority Data

Jan. 30, 1987 [FI] Finland ................... 870404

[51] Int. Cl.⁴ .............................................. F02C 3/28
[52] U.S. Cl. .................................. 60/39.05; 60/39.12; 60/39.464
[58] Field of Search ............... 60/39.05, 39.12, 39.464, 60/39.02; 34/10

[56] References Cited

U.S. PATENT DOCUMENTS

| | | | |
|---|---|---|---|
| 2,650,190 | 8/1953 | Steinschlaeger | 60/39.464 |
| 2,677,236 | 5/1954 | Grinsted | 60/39.464 |
| 2,735,265 | 2/1956 | Eastman | 60/39.464 |
| 3,990,229 | 11/1976 | Staege | 60/39.12 |
| 4,209,304 | 6/1980 | Kessler et al. | 34/10 |
| 4,245,395 | 1/1981 | Potter | 34/10 |
| 4,501,551 | 2/1985 | Riess et al. | 34/10 |
| 4,689,949 | 9/1987 | Kashiwazaki et al. | 60/39.12 |

*Primary Examiner*—Louis J. Casaregola
*Attorney, Agent, or Firm*—Birch, Stewart Kolasch & Birch

[57] ABSTRACT

This publication discloses a method and an apparatus for the utilization of the heat value of a water-bearing fuel in a gas turbine power plant. The apparatus comprises a high-pressure combustion unit (7), a gas turbine (15), a generator (16), and heat recovery units, the latter connected the system close to the gas turbine (15) outlet. According to the invention the water-bearing fuel is dried in a high pressure by the heat energy of the turbine exhaust gases, and the steam generated in the dryer stage is fed to the high-pressure section of the combustion process, at a point between a compressor (9) and the turbine (15), that is, for instance, into the combustion or gasification unit (7). The system in accordance with the invention provides for the utilization of the heat value of fuels having a high moisture content.

5 Claims, 1 Drawing Sheet

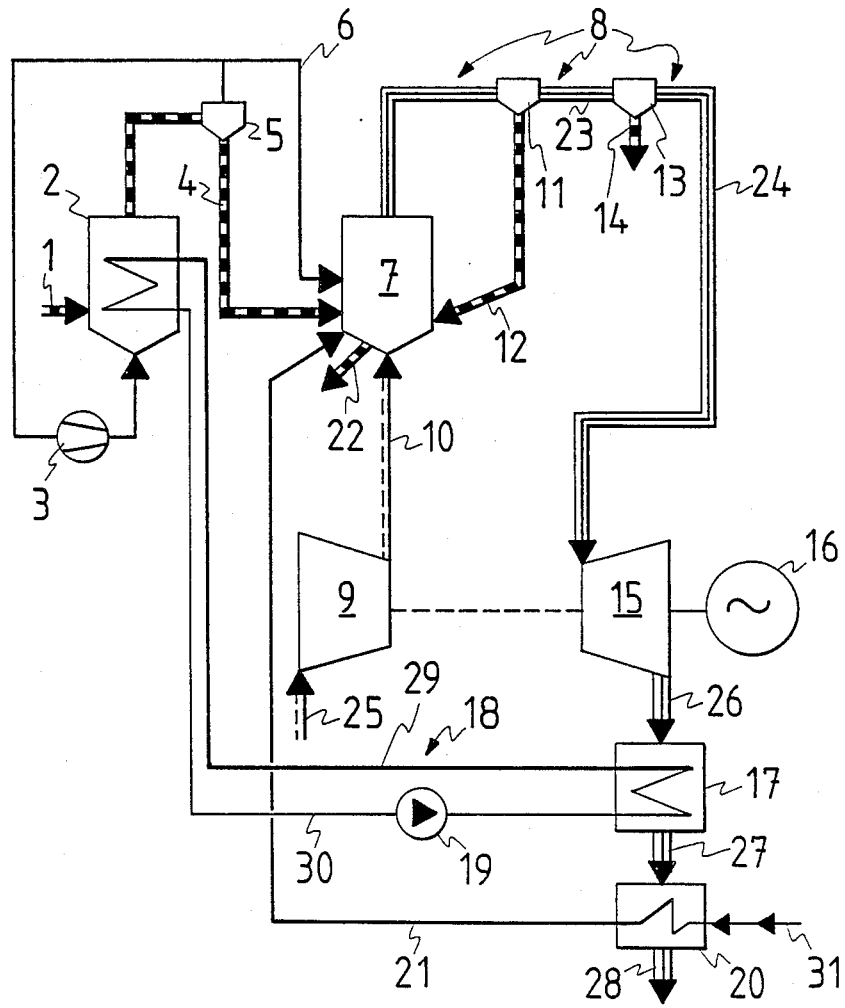

GAS TURBINE POWER PLANT FIRED BY A WATER-BEARING FUEL AND METHOD FOR UTILIZING THE HEAT VALUE OF SAID FUEL

BACKGROUND OF THE INVENTION

The present invention relates to a gas turbine power plant fired by a waterbearing fuel.

The invention also concerns method for utilizing the heat value (calorific value) of a water-bearing fuel.

Presently, a predried solid fuel, e.g., peat, wood chips, or coal, is burned in a low pressure using, for instance, a stoker fired boiler, pulverized fuel fired boiler, or fluidized bed boiler. The art also conventionally utilizes fuel oil and natural gas for generation of heat and electric energy in a gas turbine process. The aforementioned process can also be complemented by a process referred to as the Rankine cycle where steam is generated in the exhaust gas boiler of the turbine and fed into a separate steam turbine. In a more advanced modification of the method, steam is fed as injection steam into the gas turbine itself whereby both the mass flow through the turbine and the heat value of the gas are increased and the output power at the gas turbine shaft as well as the process efficiency are improved. Test plants utilizing coal for firing the gas turbine also exist.

SUMMARY OF THE INVENTION

A disadvantage of the conventional technique is that particularly the utilization of peat for firing conventional boilers in small power plants has been uneconomical due to the high cost of the preceding de-watering process of the peat. Furthermore, the conventional construction of a gas turbine is not applicable to peat-firing.

The aim of the present invention is to overcome the disadvantages of prior art technology and provide a totally new kind of gas turbine power plant fired by a water-bearing fuel as well as a method for utilizing the heat value of said fuel.

The invention is based on the idea of de-watering the fuel in a high-pressure dryer heated by the waste heat of the gas turbine and feeding the generated steam into the high-pressure section of the process.

The invention provides outstanding benefits.

The gas turbine power plant in accordance with the invention permits the utilization of the heat value of a fuel without resorting to a complicated pretreatment. Particular benefits are achieved in the combustion of peat. Here, the moisture content of the peat does not lower the efficiency of the process; rather, this moisture is beneficially utilized. In optimal cases, a mere mechanical compaction of peat is sufficient obviating peat preprocessing and de-watering at the peatland site. In spite of the high initial cost of the high-pressure dryer construction, a cost-effective solution is provide due to the low market price of the fuel, in comparison with fuels presently used. The market price of peat utilizable in the process is essentially lower than that of dried peat. The auxiliary equipment in the system in accordance with the invention does not impose extra costs in respect to conventional technology. A particularly advantageous situation is attained if the gas turbine power plant can be located in the vicinity of a peatland, resulting in minimized fuel transportation costs.

BRIEF DESCRIPTION OF THE DRAWINGS

The invention is next examined in detail with help of the following exemplifying embodiment illustrated by the attached drawing.

The figure shows schematically a gas turbine power plant utilizing a water-bearing fuel in accordance with the invention.

DETAILED DESCRIPTION OF THE PREFERRED EMBODIMENT

Typical design values for the process depicted in the FIGURE are given in Table 1, supplemented by an energy balance sheet in Table 2.

The fuel is fired in a combustor, or combustion unit 7, which comprises a combustion chamber brought to a positive pressure with help of a compressor 9. The compressor 9 delivers the required combustion air which is fed into the combustion unit 7 via a compressed air piping 10. Via an auxiliary steam pipe 6, the combustion unit 7 is provided with a proportion of the steam separated in a steam separator 5 from the peat fuel flow, while some of the steam is recirculated to a dryer 2. In addition, steam is fed into the combustion unit 7 via a pipe 21 from a separate steam generator 20. One purpose of feeding the combustion unit with steam is to provide means for controlling the outlet gas temperature in that the steam makes up for the excess inlet air normally required. Because of the steam supply, the compressor power losses are decreased, resulting in an increased net output power from the process. A portion of the fuel ashes is tapped immediately from the combustion unit 7 via channels 22, while the rest is carried along the flue gas flow to a flue gas piping 8, and further to a hot scrubber 13, where it is removed from the process via a tap joint 14. The flue gas line may be provided with a separate scrubber 11 that removes the largest particles from the flue gases and recycles them via a return pipe 12 to the combustion unit 7.

Next to the flue gas scrubber 13, the flue gases are further fed via the flue gas piping 8 to a gas turbine 15 where the gases expand and generate inertial energy. The inertial energy is used for rotating the compressor 9 and an electric power producing generator 16, which are both attached to the turbine shaft. The turbine used in the exemplifying embodiment is a gas turbine, type GT 35 C, by Asea Stal Ab. Next to the turbine 15, the exhaust gases are fed into a separate exhaust heat recovery unit 17, in which a water-circulating circuit generates hot steam into a piping 18, along which the enerqy contained by the steam is fed into the dryer 2 to be used for the de-watering of the fuel. The piping 18 has a water-circulating pump 19 attached to it. From the exhaust heat recovery unit 17, the exhaust gases are fed into a steam generator 20, in which the heat energy still remaining in the exhaust gases is utilized for generating steam into the steam piping 21. As required, the order of the steam generator 20 and the heat recovery unit 17 may be interchanged. These two units may conceivably be replaced a combination unit. Further, instead of generating steam, the heat recovery unit 17 can be used either for generating hot water or for superheating the steam used in fuel de-watering.

The fuel feed stock is carried via a high-pressure joint 1 to the dryer 2. The calculations of the exemplifying embodiments are based on the use of milled peat having a 70% moisture content. The process in accordance with the invention can also be fed with peat coming directly from a mechanical de-watering process and having a moisture content in excess of 80%. If the drying (de-watering) process is carried out in the pressure of the combustion process, the water contained by the peat can be recovered as process medium by feeding it in the form of saturated steam into the combustion chamber. In principle, the fuel used may be any water-bearing solid or liquid fuel. The milled peat is dried in the high-pressure dryer 2 to a moisture content of 20%. In the exemplifying embodiment, the dryer 2 is a fluidized bed steam dryer, but in regard to the process, it can be any high-pressure type of dryer. Part of the generated steam is recirculated by a fluidizing draft fan 3 in order to fluidize the material in the bed. Energy for drying is fed via the piping 18 from the exhaust gas heat recovery unit 17 of the gas turbine 15.

The combustion unit 7 may also be replaced by total or partial gasification of fuel and burning of the generated gas. In these embodiments, gas scrubbing is usually provided prior to combustion, thus making the scrubbing temperature of gases independent of the inlet temperature of the gas turbine. Furthermore, in this case, the maximum temperature of the gasification unit is not dependent on the inlet temperature of the gas turbine 15 in the same way as the temperature of the combustion unit 7.

Gasification can be implemented either as air, oxygen, or pyrolytic gasification. In oxygen gasification, the compressor 9 is replaced by an oxygen generator or storage unit, or by an oxygen generator and compressor. The process is compliant with all gasification reactor types and firing methods.

Gas scrubbing can be done either at the combustion or the gasification temperature, or at any lower temperature. Steam flows from pipes 6 and 21 can be fed as injection steam into the combustion chamber or the gasification unit, or to any part of the high—pressure gas line —either before or after the combustion or the gasification unit. The steam flows may also be conducted to a point between the stages of the gas turbine 15. If there is a need to cool the firing or gasification gas, the energy released in the cooling process can be utilized to generate, for example, steam, which is then conducted principally in the manner as the steam flow from the steam pipe 21. Separation of steam and peat in the steam separator 5 is not necessary; instead, the fuel and generated steam can also be fed intermixed into the combustion or gasification unit.

In the exemplifying embodiment, the electrical efficiency of the process is about 45%. By increasing the inlet temperature of the gas turbine 15 from the value of 850 20 C. employed in the embodiment to a higher level, appreciable improvement in the efficiency may further be achieved. This is particularly the case in conjunction with gasification technology, where the temperatures of the reactor 7 or the gas scrubber 13 do not set limits to the inlet temperature of the gas turbine 15 in the same manner as with embodiments based on combustion. In the illustrated embodiment, the referred inlet temperature of 850 ° C. results from the maximum allowable combustion temperature in the fluidized bed. It will be appreciated that with a decreasing level of moisture content in the fuel, the amount of steam generated in the steam generator 20 is increased and the energy recovered in the heat recovery unit 17 is decreased. With an increasing moisture content, the opposite is true.

In respect to the applicability of the invention, the feed of supplemental steam via the piping 21 not absolutely essential.

TABLE 1

Process design values and mass flow balance sheet (see Fig.)

| Point no. in Fig. | Mass flow m (kg/s) | Temp. t (°C.) | Pressure p (bar) | Material |
|---|---|---|---|---|
| 1 | 10.1 | 15 | 13.5 | Peat, m.c. 70% |
| 4 | 3.8 | 150 | 13.5 | Peat, m.c. 70% |
| 6 | 6.3 | 212 | 13.5 | Steam |
| 22 | 0.06 | 150 | 13.0 | Ash |
| 23 | 87.9 | 850 | 12.5 | Flue gas |
| 24 | 87.8 | 850 | 12.0 | Flue gas |
| 26 | 87.8 | 425 | 1 | Flue gas |
| 27 | 87.8 | 256 | 1 | Flue gas |
| 29 | 9.3 | 237 | 22 | Steam |
| 30 | 9.3 | 227 | 22 | Water |
| 25 | 74.9 | 0 | 1 | Air |
| 10 | 74.9 | 349 | 13.0 | Air |
| 14 | 0.09 | 150 | 13.0 | Ash |
| 31 | 3.1 | 5 | 12.5 | Water |
| 21 | 3.1 | 190 | 12.5 | Steam |
| 28 | 87.8 | 173 | 1 | Flue gases |

(m.c. = moisture content)

TABLE 2

Process energy balance sheet excluding internal electric power consumption (see Fig.)

| | |
|---|---|
| Input energy in fuel | 45.9 MJ/s |
| Turbine inertial energy | 47.8 MJ/s |
| Compressor input energy | 27.1 MJ/s |
| Net output energy (available for electric power generation) | 20.7 MJ/s |
| Electrical efficiency | 45.0% |

What is claimed is:

1. A gas turbine power plant fired by a water-bearing fuel, e.g., peat, comprising:
   a high-pressure gasification unit (7),
   fuel feed means (1, 2, 3) for feeding the fuel into the or gasification unit (7),
   a gas turbine (15) for utilizing the inertial energy of flue gases
   at least one flue gas pipe (8), attached to the gasification unit (7), through which the combustion products of the fuel can be fed into the gas turbine (15),
   gas scrubber elements (11, 13), attached to the flue gas pipes (8), so that the flue gases can be scrubbed,
   a compressor (9), driven by the gas turbine (15), by which a positive pressure can be provided into the gasification unit (7),
   a generator (16), driven by the gas turbine (15), by which electric energy can be produced, and exhaust gas heat recovery elements (17, 20), attached close to the outlet of the gas turbine (15), suitable for the recovery of heat energy from the exhaust gases,
   a high-pressure dryer means for conducting the entire drying process in a pressurized state (2), from which the fuel is fed into the gasification unit (7), and
   first heat transfer means (18), interconnecting the dryer (2) and a first one of said turbine exhaust gas heat recovery elements (17), along which the recovered heat energy of the exhaust gases can be transferred to the dryer (2) in order to dry the water-bearing fuel second heat transfer means (21) through which generated steam is introduced into a high-pressure section of the process at a point between the compressor (9) and the turbine (15) and into the gasification unit (7) and the heat energy used by said first and second heat transfer means is solely the heat energy exhausted from the turbine.

2. A gas turbine power plant in accordance with claim 1, wherein the high-pressure dryer (2) is a fluidized bed steam dryer.

3. A gas turbine power plant in accordance with claim 1 or 2, wherein said second heat transfer means includes steam feed pipes (21) attached to a steam generator (20), said steam feed pipes (21) are attached at one end to the high-pressure section of the process at a point between the compressor (9) and the turbine (15) to the gasification unit (7).

4. A method for recovering the heat energy of a water-bearing fuel, e.g., peat, in a gas turbine power plant, in which method fuel is fed into a high-pressure gasification unit (7) in order to gasify the fuel, the generated flue gases are led via gas scrubber utilize the inertial and heat energy of the flue gases, the generated inertial energy is used to drive a compressor (9), which provides positive pressure in the gasification unit (7), and to drive a generator (16) for the production of electric power, the heat energy of flue gases after passing through the gas turbine (15) is recovered by means of first and second heat recovery elements (17, 20) said first heat recovery element generating steam or superheated steam, or heating water, and drying the fuel entirely under high pressure solely by means of the heat energy available from the flue gases after passing through the gas turbine (15), and steam generated in said second heat recovery element is fed into the high-pressure section of the process, at a point between the compressor (9) and the turbine (15) to the gasification unit (7).

5. A method in accordance with claim 4, wherein the drying of the fuel is in a fluidized bed dryer and the fuel being utilized has an initial moisture content percentage of about 70% or higher.

* * * * *